(12) United States Patent
Taylor (10) Patent No.: US 9,811,144 B2
(45) Date of Patent: Nov. 7, 2017

(54) INDUSTRIAL MACHINE HAVING A POWER CONTROL SYSTEM

(71) Applicant: Harnischfeger Technologies, Inc., Wilmington, DE (US)

(72) Inventor: Wesley P. Taylor, Glendale, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 326 days.

(21) Appl. No.: 14/630,756

(22) Filed: Feb. 25, 2015

(65) Prior Publication Data
US 2016/0246357 A1    Aug. 25, 2016

(51) Int. Cl.
*G05B 15/02*    (2006.01)
*G06F 1/32*    (2006.01)
*G05B 19/042*    (2006.01)

(52) U.S. Cl.
CPC .......... *G06F 1/325* (2013.01); *G05B 19/0426* (2013.01); *G05B 2219/2616* (2013.01); *Y02B 70/3241* (2013.01); *Y04S 20/227* (2013.01)

(58) Field of Classification Search
CPC ..... G05B 15/02; G06F 1/3209; G06F 1/3287; G06F 1/3296
See application file for complete search history.

(56) References Cited

U.S. PATENT DOCUMENTS

| | | |
|---|---|---|
| 3,288,532 A | 11/1966 | Carver |
| 3,508,132 A | 4/1970 | Peterson |
| 4,358,719 A | 11/1982 | Currier et al. |
| 7,992,370 B2 | 8/2011 | Sheidler et al. |
| 8,174,225 B2 | 5/2012 | Mazumdar et al. |
| 8,499,909 B2 | 8/2013 | Mazumdar et al. |
| 8,536,814 B2 | 9/2013 | Mazumdar et al. |
| 2005/0253551 A1 | 11/2005 | Koellner |

(Continued)

FOREIGN PATENT DOCUMENTS

| | | |
|---|---|---|
| JP | 2007129850 | 5/2007 |
| JP | 2014183717 | 9/2014 |
| WO | 2010062398 | 6/2010 |

OTHER PUBLICATIONS

International Search Report and Written Opinion for Application No. PCT/US2016/019319 dated May 30, 2016 (11 pages).

*Primary Examiner* — Kenneth M Lo
*Assistant Examiner* — Yuhui R Pan
(74) *Attorney, Agent, or Firm* — Michael Best & Friedrich LLP (57) ABSTRACT

A system includes a first industrial machine and a second industrial machine. The system also includes a power distribution system configured to provide power to the first industrial machine and the second industrial machine. The first industrial machine includes a first power control system configured to monitor power usage of the first industrial machine, and transmit power usage information of the first industrial machine to the second industrial machine. The second industrial machine includes a second power control system configured to monitor power usage of the second industrial machine, receive the power usage information from the first industrial machine, and control power usage of the second industrial machine based on the power usage information received from the first industrial machine.

18 Claims, 7 Drawing Sheets

(56) References Cited

U.S. PATENT DOCUMENTS

| | | | |
|---|---|---|---|
| 2007/0055636 A1* | 3/2007 | Chambers | G06Q 50/188 705/80 |
| 2011/0175579 A1 | 7/2011 | Mazumdar | |
| 2012/0049625 A1* | 3/2012 | Hopwood | E21B 3/00 307/32 |
| 2012/0298004 A1 | 11/2012 | Osara et al. | |
| 2013/0030590 A1 | 1/2013 | Prosser | |
| 2013/0206490 A1 | 8/2013 | Kouvo et al. | |
| 2013/0274939 A1* | 10/2013 | Eger | G06Q 30/04 700/291 |
| 2014/0032006 A1 | 1/2014 | Tojima et al. | |
| 2014/0115357 A1* | 4/2014 | Li | G06F 1/3206 713/320 |
| 2014/0246909 A1 | 9/2014 | Todorski | |

* cited by examiner

First Machine

FIG. 6B

Second Machine

FIG. 6C

Third Machine

FIG. 7

INDUSTRIAL MACHINE HAVING A POWER CONTROL SYSTEM

BACKGROUND

The present invention relates to controlling power usage of a system of industrial machines.

SUMMARY

More than one industrial machine is sometimes used to complete large projects (e.g., construction projects, mining projects, etc.). The industrial machines and other equipment for these projects are often powered by the electrical grid. The energy company may charge for the electricity from the electrical grid based on the highest overall peak power that is used. In other words, the cost for electric power may be based on the highest cumulative peak power used by all the industrial machines and equipment receiving power from the electrical grid at a particular site. Therefore, project managers have an incentive to maintain low overall power usage during the project. However, project managers also have an incentive to operate the machines at a maximum efficiency in order to complete the project on time.

Achieving a balance between maximum efficiency and lowest costs has proven challenging. To complicate matters further, due to the nature of the project or coincidence, several of the industrial machines may begin to operate at their respective peak power level at the same time. If several industrial machines each operate at their respective peak power level, the overall power usage is increased and the overall peak power usage may also increase, which increases the cost for electricity. As an operator of a single industrial machine, it is impossible or exceedingly difficult to know when the aggregate power usage of all machines may be approaching an undesirably high value. Therefore, it is difficult for an operator of a single industrial machine to determine when to limit the power usage of the industrial machine and when to allow the industrial machine to utilize full power to complete a task.

The invention described below provides an industrial machine that includes a power control system. The power control system allows the industrial machine to automatically determine when it is appropriate and/or necessary to limit its power usage and when it is appropriate to operate at full power. The power control system allows the industrial machine to not only monitor its own power usage, but also to communicate with other industrial machines in the same system regarding the power usage of each machine. The industrial machine is then able to adapt or modify its operation when it receives an indication that the overall power consumption may be approaching an overall peak power threshold value. Thus, the overall power usage of the system can be prevented from exceeding the peak power threshold value, and energy costs can be reduced or minimized while maintaining the efficiency of the system.

In one embodiment, the invention provides a system including a first industrial machine and a second industrial machine. The system also includes a power distribution system configured to provide power to the first industrial machine and the second industrial machine. The first industrial machine has a first power control system. The first power control system is configured to monitor power usage of the first industrial machine, and transmit power usage information of the first industrial machine to the second industrial machine. The second industrial machine has a second power control system. The second power control system is configured to monitor power usage of the second industrial machine, receive power usage information from the first industrial machine, and control power usage of the second industrial machine based on the power usage information received from the first industrial machine.

In another embodiment, the invention provides a method of controlling an industrial machine having a power control system. The method includes receiving power from a power distribution system and monitoring, by the power control system, power usage of the industrial machine. The method also includes receiving power usage information from a second industrial machine receiving power from the power distribution system, and controlling power usage of the industrial machine based on the power usage information received from the second industrial machine.

In another embodiment the invention provides an industrial machine including a component and an actuator coupled to the component. The actuator is configured to provide a force to the component. The industrial machine also includes a power control system electrically coupled to the actuator and to a power distribution system. The power control system is configured to monitor a state of the industrial machine, receive state information from a second industrial machine receiving power from the power distribution system, and control power usage of the industrial machine based on the state information received from the second industrial machine.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components."

DETAILED DESCRIPTION

Embodiments of the invention described herein are related to industrial machines that monitor their power usage and communicate with other industrial machines regarding their power usage. Industrial machines are often utilized for projects that use more than one industrial machine and other related equipment. The power for the industrial machines and the other equipment is often provided by the electrical grid. However, the cost for supplied power is sometimes based on an overall or cumulative peak power usage. To prevent the overall power usage for the system from exceeding a predetermined peak power usage, each of the industrial machines is equipped with a power control system. The power control system monitors the power usage (e.g., an actual power usage or an expected power usage) of the industrial machine, communicates with other machines regarding the power usage of the industrial machine and the power usage of the other industrial machines, and adapts the operation of the industrial machine so that the overall power usage (i.e., the power usage of all the industrial machines and equipment) does not exceed the specified peak power usage.

The power control system sets different thresholds to monitor the power usage of the industrial machine. The power control system also receives information regarding the power usage of the other industrial machines and determines whether to alter the operation of the first industrial machine based on the received power usage information from the other industrial machines. For example, if the power control system receives information from another industrial machine indicating that the other industrial machine is operating at a high power usage, the power control system may reduce the power usage of the industrial machine. Therefore, as the power usage of one of the industrial machines increases, the power usage of the other industrial machines can be decreased such that the overall power usage of the system is maintained below the specified peak power level.

Figure 1:
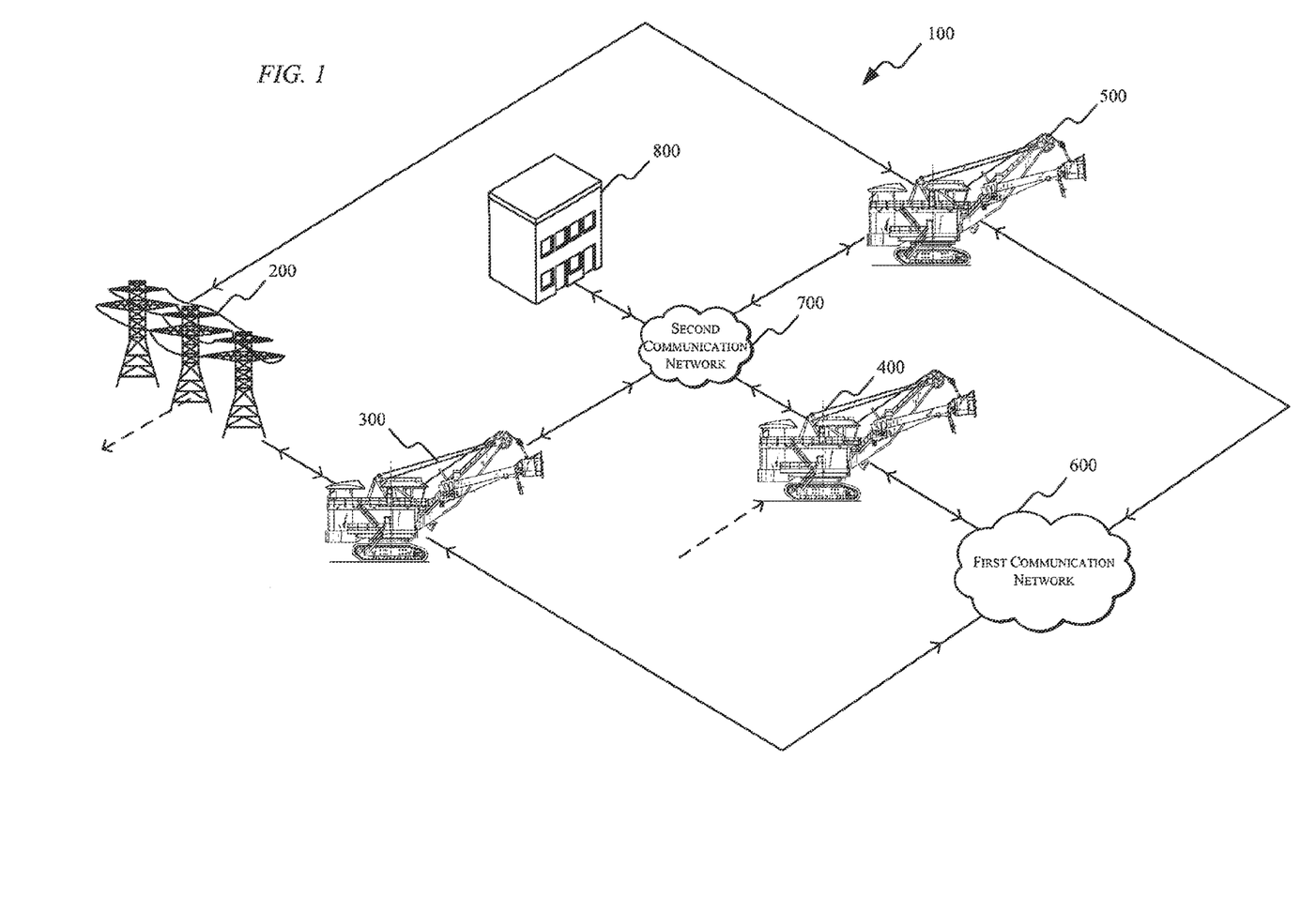
FIG. 1 illustrates a system of industrial machines.

FIG. 1 illustrates a system 100 that includes, among other things, a power distribution system 200, a plurality of industrial machines 300, 400, 500, a first communication network 600, a second communication network 700, and a monitoring system 800. The industrial machines 300, 400, 500, are each configured to perform a specific task (e.g., digging, transporting, process, etc.) related to an application of the system 100. The power distribution system 200 supplies power to each of the industrial machines 300, 400, 500 and to other components of the system such as, for example, servers, monitoring computers, tools, lights, and the like. Each of the industrial machines 300, 400, 500 includes a power control system 353 (see FIG. 4) coupled to the first network 600. The industrial machines 300, 400, 500 communicate with each other through the first network 600 regarding a state of each of the industrial machines 300, 400, 500. The state of the industrial machines 300, 400, 500 may include a digging operation, a lifting operation, a moving operation, etc. Each state of the industrial machines 300, 400, 500 includes a power characteristic or attribute such as, for example, an actual power usage, an expected power usage, an average power usage, a power usage based on currently consumed power, etc. Some machine states may have a higher or lower power characteristic than other machine states. Therefore, by monitoring the state of the industrial machine, the power control system 353 (see FIG. 4) can monitor, directly or indirectly, the power characteristic or attribute (e.g., the power usage) of the industrial machine 300, 400, 500. The first network 600 is, for example, a short range wireless network using, for example, the Bluetooth®, or Wi-Fi® protocol for communication. Alternatively, the first network 600 includes a wide-area wireless network, such as the Internet. In some embodiments, the first network 600 enables optical, infrared, or radio frequency communications between the industrial machines 300, 400, 500.

The power control system 353 of each industrial machine 300, 400, 500 monitors power usage and adjusts operation of the industrial machine 300, 400, 500 based on, among other things, the power usage of the other industrial machines 300, 400, 500 in the system 100. The industrial machines 300, 400, 500 are also communicatively coupled to the second network 700 to exchange (i.e., send or receive) information from the monitoring system 800. The second network 700 is, for example, a short range wireless network using, for example, the Bluetooth®, or Wi-Fi® protocol for communication. Alternatively, the second network 700 includes a wide-area wireless network, such as the Internet. In some embodiments, the second network 700 enables optical, infrared, or radio frequency communications between the industrial machines 300, 400, 500. The monitoring system 800 may forward information regarding specific tasks to the industrial machine 300, 400, 500. Additionally or alternatively, the industrial machine 300, 400, 500 may communicate to the monitoring system 800 data or information regarding the tasks associated with the industrial machine 300, 400, 500. Furthermore, the monitoring system 800 may be configured to communicate with a local or remote user regarding the overall operation of the system 100 and the operation of each of the industrial machines 300, 400, 500. In some embodiments, the first network 600 and the second network 700 are combined or implemented as a single network.

The power distribution system 200 includes a network of cables, transformers, interrupters, and the like that allow electrical power to be provided to the system 100. As described herein, the power distribution system 200 includes an electrical power grid. The power distribution system 200 receives electrical power from a power plant and distributes the electrical power over a particular area, specifically to the system 100. The system 100 is charged for electricity usage based on the peak power consumption that is provided by the power distribution system 200. Since each of the industrial machines 300, 400, 500 may operate independently, in some situations, several industrial machines may reach peak power consumption, or a state with a high power characteristic, (as established for each industrial machine 300, 400, 500) at the same time. When several industrial machines reach their peak power consumption, the overall or cumulative power consumption of the system 100 is also increased. Since the power distribution system 200 is sized and configured to accommodate a situation in which the system 100 consumes a predetermined peak power threshold, such increases in cumulative power consumption increase the cost for operating and providing power to the system 100. The power control system 353 included in each of the industrial machines 300, 400, 500 monitors the power usage of each industrial machine and adapts operation of the industrial machine 300, 400, 500 when the power usage of the other industrial machines 300, 400, 500 increases. Therefore, the power control system 353 helps reduce power demand peaks received by the power distribution system 200.

Figure 2:
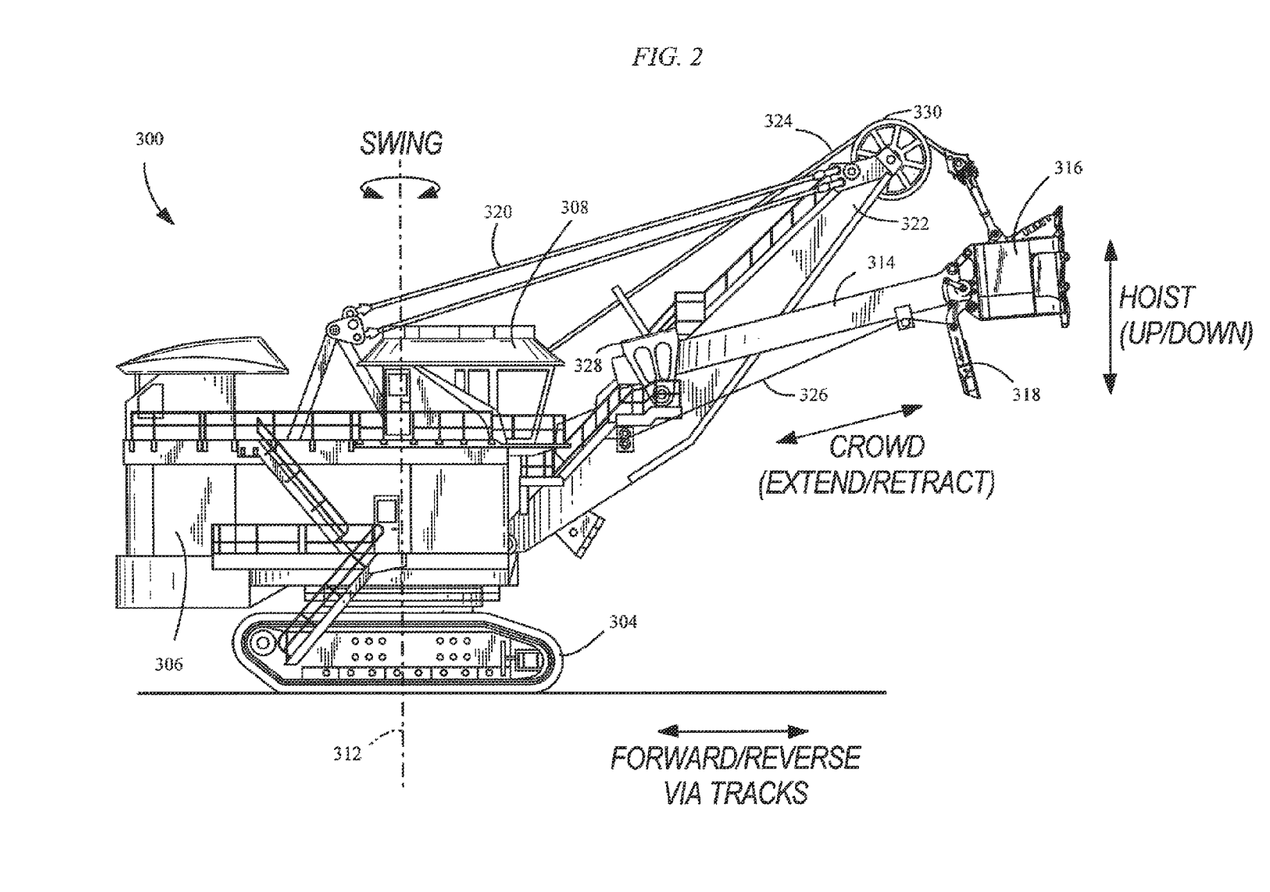
FIG. 2 illustrates an industrial machine of the system shown in FIG. 1.

Although the invention described herein can be applied to, performed by, or used in conjunction with a variety of industrial machines (e.g., a rope shovel, a dragline, AC machines, DC machines, hydraulic machines, etc.), embodiments of the invention described herein are described with respect to an electric rope or power shovel, such as the power shovel 300 shown in FIG. 2. The industrial machines 300, 400, 500 may all be different types of industrial machines or the same type of industrial machine. In some embodiments, the second industrial machine 400 may include a dragline, while the third industrial machine 500 may include a bucket wheel excavator. Embodiments of the invention described herein, however, are described with each of the industrial machines 300, 400, 500 being the same type of industrial machine. Therefore, only the first industrial machine 300 is described in detail. The second and third industrial machines 400, 500 have similar components and functionality unless otherwise specified.

As shown in FIG. 2, the first industrial machine 300 includes tracks 304 for propelling the industrial machine 300 forward and backward, and for turning the industrial machine 300 (i.e., by varying the speed and/or direction of left and right tracks relative to each other). The tracks 304 support a base 306 including a cab 308. The base 306 is able to swing or swivel about a swing axis 312, for instance, to move from a digging location to a dumping location. Movement of the tracks 304 is not necessary for the swing motion. The industrial machine 300 further includes a component such as, for example, an excavation tool, a pivotable dipper handle 314 and dipper 316, etc. The dipper 316 includes a door 318 for dumping the contents of the dipper 316. In embodiments in which the second and third industrial machines 400, 500 are different than the first industrial machine 300, the component for the second and third industrial machines 400, 500 may be different, as well as the supporting structure. For example, if the second industrial machine 400 includes a dragline, the excavation tool may include the dragline bucket. In other embodiments, and based on the nature of the industrial machine, the component may include a shovel, a boom, dump box, a drill, a blade, an elevator, a mixer, a lift, a cutter, or combinations thereof.

The industrial machine 300 includes suspension cables 320 coupled between the base 306 and a boom 322 for supporting the boom 322. The industrial machine 300 also includes a wire rope or hoist cable 324 attached to a winch and hoist drum (not shown) within the base 306 for winding the hoist cable 324 to raise and lower the dipper 316, and a crowd cable 326 connected between another winch (not shown) and the dipper door 318. The industrial machine 300 also includes a saddle block 328, and a sheave 330. In some embodiments, the industrial machine 300 is a P&H® 4100 series shovel produced by P&H Mining Equipment Inc.

Figure 3:
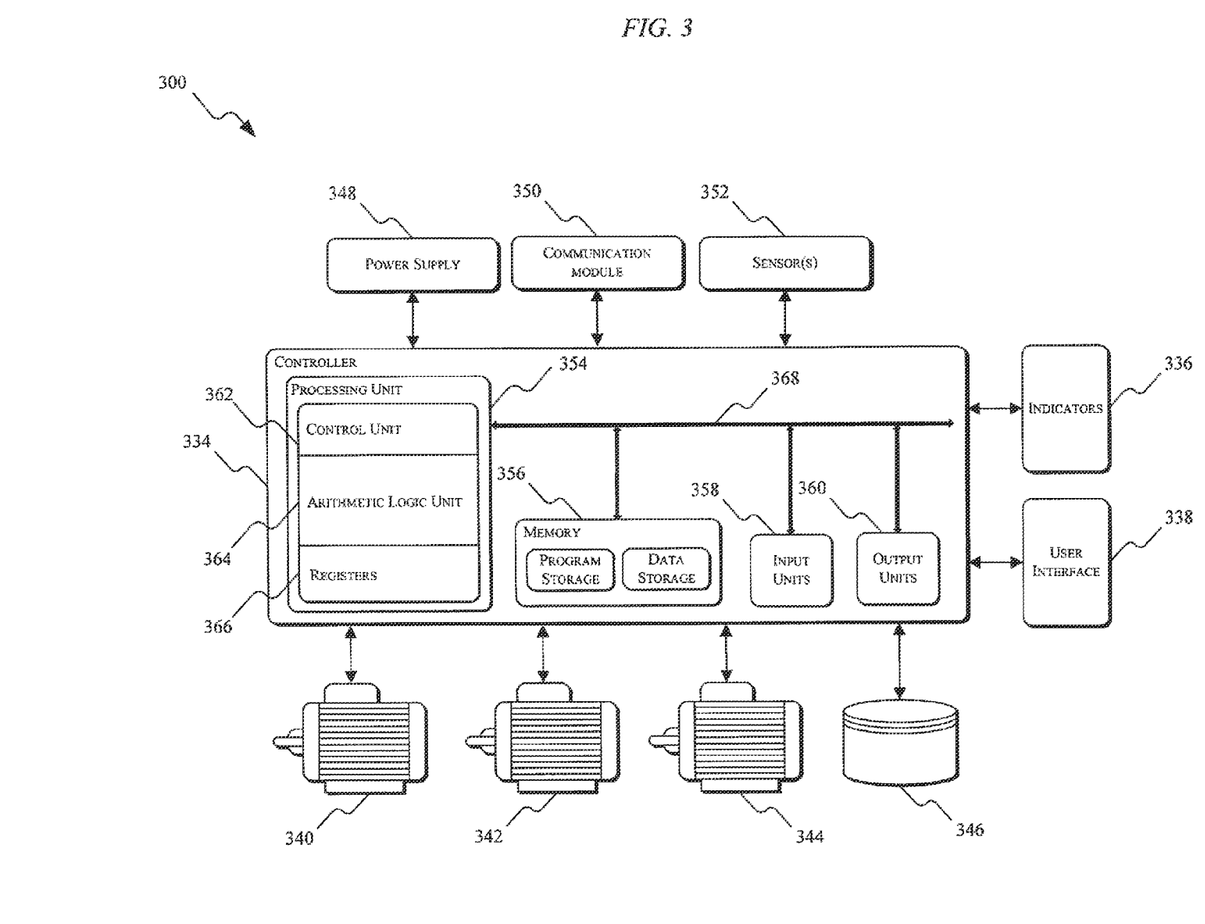
FIG. 3 is a schematic diagram of the industrial machine of the system shown in FIG. 1.
Figure 4:
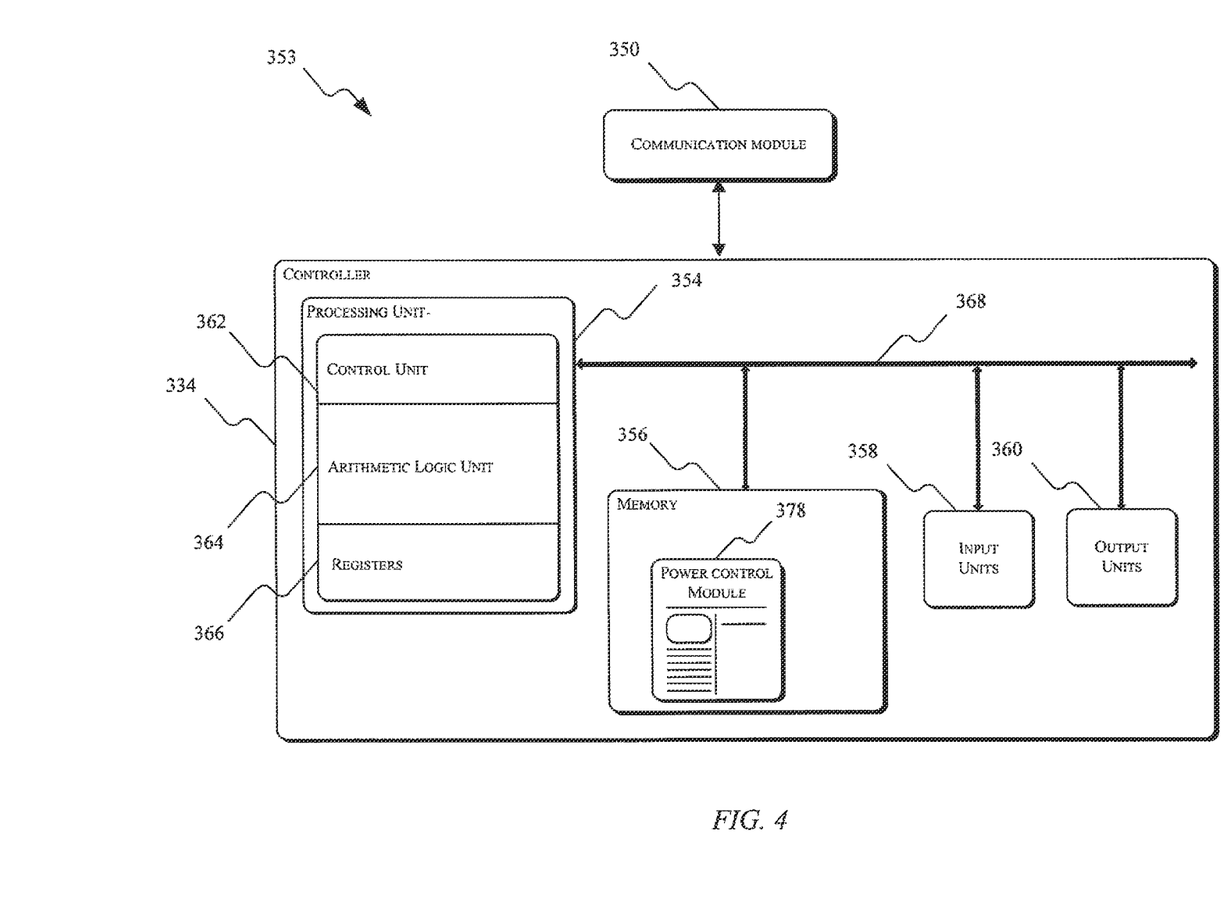
FIG. 4 is a schematic diagram of a power control system of the industrial machine shown in FIG. 2.

FIG. 3 illustrates a controller 334 associated with the industrial machine 300. The controller 334 is electrically and/or communicatively connected to a variety of modules or components of the industrial machine 300. For example, the illustrated controller 334 is connected to one or more indicators 336, a user interface module 338, one or more hoist actuators (e.g., motors, hydraulic cylinders, etc.) and hoist drives 340, one or more crowd actuators (e.g., motors, hydraulic cylinders, etc.) and crowd drives 342, one or more swing actuators (e.g., motors, hydraulic cylinders, etc.) and swing drives 344, a data store or database 346, a power supply module 348, and one or more sensors 352. The first industrial machine 300 also includes a power control system 353. As shown in FIG. 4, the power control system 353 includes a communication module 350 operatively coupled to the controller 334, and a power control module 378 coupled to and implemented by the controller 334 for controlling the power usage of the first industrial machine 300.

The controller 334 includes combinations of hardware and software that are operable to, among other things, monitor power usage of the first industrial machine 300, control the operation of the first industrial machine 300, control the position of the boom 322, the dipper handle 314, the dipper 316, etc., activate the one or more indicators 336 (e.g., a liquid crystal display ["LCD"]), monitor the operation of the industrial machine 300, etc. The one or more sensors 352 include, among other things, a loadpin, a strain gauge, one or more inclinometers, gantry pins, one or more motor field modules (e.g., measuring motor parameters such as current, voltage, power, etc.), one or more rope tension sensors, one or more resolvers, etc. In some embodiments, a crowd drive other than a crowd motor drive can be used (e.g., a crowd drive for a single legged handle, a stick, a hydraulic cylinder, etc.).

In some embodiments, the controller 334 includes a plurality of electrical and electronic components that provide power, operational control, and protection to the components and modules within the controller 334 and/or the first industrial machine 300. For example, the controller 334 includes, among other things, a processing unit 354 (e.g., a microprocessor, a microcontroller, or another suitable programmable device), a memory 356, input units 358, and output units 360. The processing unit 354 includes, among other things, a control unit 362, an arithmetic logic unit ("ALU") 364, and a plurality of registers 366 (shown as a group of registers in FIG. 3), and is implemented using a known computer architecture, such as a modified Harvard architecture, a von Neumann architecture, etc. The processing unit 354, the memory 356, the input units 358, and the output units 360, as well as the various modules connected to the controller 334 are connected by one or more control and/or data buses (e.g., common bus 368). The control and/or data buses 368 are shown generally in FIG. 3 for illustrative purposes. The use of one or more control and/or data buses for the interconnection between and communication among the various modules and components would be known to a person skilled in the art in view of the invention described herein. In some embodiments, the controller 334 is implemented partially or entirely on a semiconductor (e.g., a field-programmable gate array ["FPGA"] semiconductor) chip.

The memory 356 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 354 is connected to the memory 356 and executes software instructions that are capable of being stored in a RAM of the memory 356 (e.g., during execution), a ROM of the memory 356 (e.g., on a generally permanent basis), or another non-transitory computer readable medium such as another memory or a disc. Software included in the implementation of the industrial machine 300 can be stored in the memory 356 of the controller 334. The software includes, for example, firmware, one or more applications, program data, filters, rules, one or more program modules, and other executable instructions. The controller 334 is configured to retrieve from memory 356 and execute, among other things, instructions related to the control processes and methods described herein. In other constructions, the controller 334 includes additional, fewer, or different components.

The power supply module 348 supplies a nominal AC or DC voltage to the controller 334 or other components or modules of the industrial machine 300. The power supply module 348 receives power from the power distribution system 200. In the illustrated embodiment, the power distribution system 200 supplies power having nominal line voltages between 100V and 240V AC and frequencies of approximately 50-60 Hz. The power supply module 348 is also configured to supply lower voltages to operate circuits and components within the controller 334 or industrial machine 300. In some constructions, the controller 334 or other components and modules within the industrial machine 300 are powered by one or more batteries or battery packs, or another grid-independent power source (e.g., a generator, a solar panel, etc.).

The user interface module 338 is used to control or monitor the industrial machine 300. For example, the user interface module 338 is operably coupled to the controller 334 to control the position of the dipper 316, the position of the boom 322, the position of the dipper handle 314, etc. The user interface module 338 includes a combination of digital and analog input or output devices required to achieve a desired level of control and monitoring for the industrial machine 300. For example, the user interface module 338 includes a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user interface module 338 can also be configured to display conditions or data associated with the industrial machine 300 in real-time or substantially real-time. For example, the user interface module 338 is configured to display measured electrical characteristics of the industrial machine 300, the status of the industrial machine 300, the position of the dipper 316, the position of the dipper handle 314, etc. In some implementations, the user interface module 338 is controlled in conjunction with the one or more indicators 336 (e.g., LEDs, speakers, etc.) to provide visual or auditory indications of the status or conditions of the industrial machine 300.

The communication module 350 exchanges (i.e., sends and/or receives) data associated with the industrial machine 300 over the first communication network 600. In the illustrated embodiment, the communication module 350 performs wireless communication over the first communication network 600. As such, the illustrated communication module 350 includes a transceiver operable to send and receive messages and an antenna to facilitate receipt and transmitting of wireless messages. The communication module 350 may communicate privately or publicly over a short range or local area network such as a network using the Bluetooth or Wi-Fi protocols, or using a wide area network such as a cellular network or the Internet. In some embodiments, the communication module 350 facilitates communication between the first network 600 through an existing mine communication system (e.g., a wireless mesh network). In other embodiments, the communication module 350 communicates with the first network 600 through a wired network.

The communication module 350 is operably coupled to the controller 334 to receive information regarding the power usage of the industrial machine 300 and then transmits a signal or message over the first network 600 that includes the information regarding the power usage of the industrial machine 300. The power usage information includes, for example, measured electrical characteristics (e.g., voltage, current draw, power consumed, instantaneous power, average power, real power, apparent power, etc.) for the industrial machine 300. The first network 600 is communicatively coupled to each of the industrial machines 300, 400, 500 in the system 100. Therefore, the first network 600 allows the industrial machine 300 to communicate power usage information among the other industrial machines 400, 500 in the system 100. The communication module 350 also receives information regarding the power usage of the other industrial machines 400, 500 in the system 100 and provides the power usage information to the controller 334. The controller 334 then uses the received power usage information to control the operation of the first industrial machine.

In some implementations, the communication module 350 also exchanges information over the second network 700. For example, the communication module 350 receives information from the controller 334 regarding the operation of the industrial machine 300 and then transmits a signal or message over the second network 700 that includes the information regarding operation of the industrial machine 300. In some embodiments, the information from the controller 334 includes measured electrical characteristics (e.g., voltage, current draw, power consumed, instantaneous power, average power, real power, apparent power, etc.) of the industrial machine 300, the load carried by the industrial machine 300, repetitions of tasks performed by the industrial machine 300, the location of the industrial machine 300, the current state of the industrial machine 300, previous tasks performed by the industrial machine 300, power requirements of the industrial machine 300, load limits of the industrial machine 300, etc. The second network 700 provides the information regarding operation of the industrial machine 300 to the monitoring system 800. The monitoring system 800 receives information from the industrial machines 300, 400, 500, and uses the received information to monitor the overall operation of the system 100. In some embodiments, the monitoring system 800 sends an alert to a user (e.g., an operator of the system 100) if any of the industrial machines 300, 400, 500 operate abnormally or if any alarm conditions are encountered by the system (e.g., lack of power).

Figure 5:
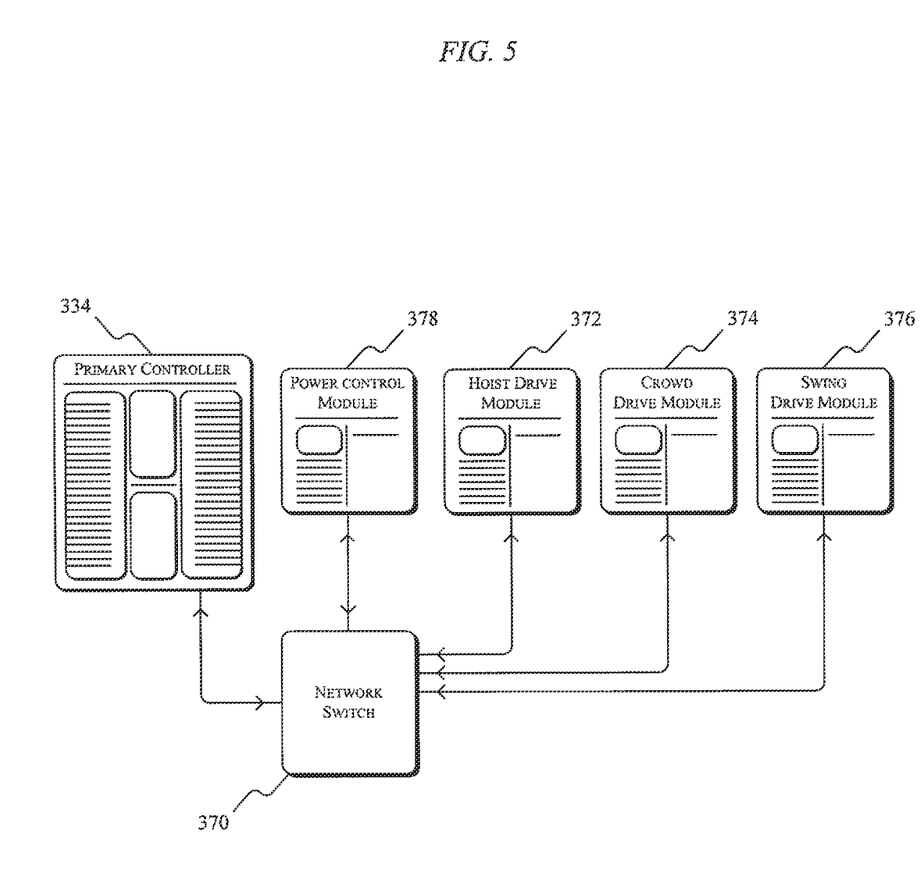
FIG. 5 is a more detailed view of a control system of the industrial machine.

FIG. 5 illustrates a more detailed control system for the first industrial machine 300. For example, the first industrial machine 300 includes a primary controller 334, a network switch 370, a hoist drive module 372, a crowd drive module 374, a swing drive module 376, and the power control module 378. The various components of the control system are connected by and communicate through, for example, a fiber-optic communication system utilizing one or more network protocols for industrial automation, such as process field bus ("PROFIBUS"), Ethernet, ControlNet, Foundation Fieldbus, INTERBUS, controller-area network ("CAN") bus, etc. The hoist drive module 372 controls operation of the hoist actuators 340 while the crowd drive module 374 controls the crowd actuators 342, and the swing drive module 376 controls the swing actuators 344. The controller 334 is also configured to receive different signals from the sensors 352. The drive modules 372, 374, 376 may include a set of instructions stored in memory 356 that allow the drive modules 372, 374, 376 to control the actuators 340, 342, 344 during different states of the first industrial machine 300. The drive modules 372, 374, 376 receive signals from the sensors 352 and from the power control module 378 to generate control signals for the actuators 340, 342, 344. The control signals from the drive modules 372, 374, 376 may control the actuators 340, 342, 344 by specifying, for example, position, speed, torque, power, current pressure, etc., of the first industrial machine 300.

The power control module 378 measures the current power usage of the first industrial machine 300 by, for example, obtaining information from the power supply module 348 and from the communication module 350 regarding the state (e.g., the power characteristic) of the first industrial machine 300. The power control module 378 may also include a set of instructions stored in memory 356 that specify the output signals from the power control module 378. In particular, the power control module 378 measures the power usage of the first industrial machine 300 and compares the power usage of the first industrial machine 300 to threshold values. The power control module 378 also determines if the second or third industrial machines 400, 500 have communicated with the first industrial machine 300 regarding the power usage of the second industrial machine 400 or the third industrial machine 500. The power control module 378 then generates output signals to be used by the drive modules 372, 374, 376 to control operation (and thereby control the power usage) of the actuators 340, 342, 344. In some instances the outputs signals from the power control module 378 are also used by the controller 334 to control other components (e.g., the user interface module 338) of the first industrial machine 300 to reduce the overall power usage of the first industrial machine 300.

As described above, the second and third industrial machines 400, 500 may be different than the first industrial machine 300 and, therefore, include different drive modules and components (e.g., excavation tools). The first, second, and third industrial machines 300, 400, 500, however, include power control systems to monitor the power usage of the industrial machines 300, 400, 500 and adapt (i.e., modify) the operation of the industrial machines 300, 400, 500 to help maintain the cumulative power usage below a predetermined peak power. In the illustrated embodiment, the first, second, and third industrial machines 300, 400, 500 are the same type of industrial machine and, therefore, include similar components.

The controller 334 and the drive modules 372, 374, 376 of each industrial machine 300, 400, 500 are configured to adapt the operation of the industrial machines 300, 400, 500 based on the state (e.g., power characteristic) of the other industrial machines 300, 400, 500. For example, the controller 334 changes the operation of the first industrial machine 300 if the controller 334 receives information from the communication module 350 that the second industrial machine 400 exceeds, or is more likely to exceed, a predetermined power threshold such that the cumulative power usage of the system 100 remains below a maximum peak power.

Figure 6A:
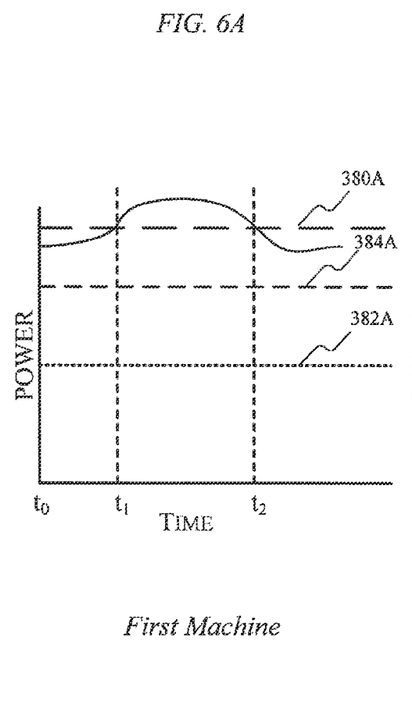
FIGS. 6A, 6B, and 6C illustrate power graphs for a first, second, and third industrial machine.
Figure 6B:
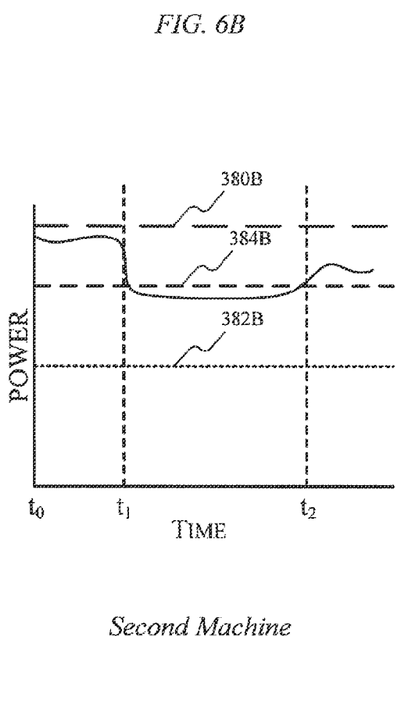
Figure 6C:
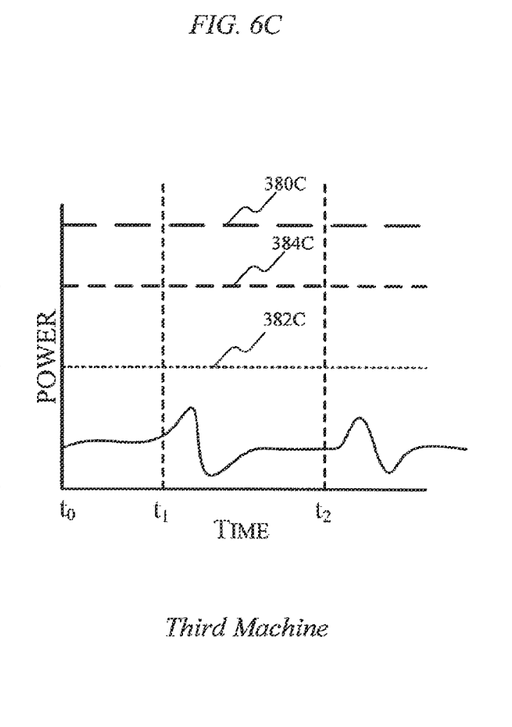

FIGS. 6A-C illustrate how each of the industrial machines 300, 400, 500 monitors individual power usage and adapts operation in response to the state of the industrial machines 300, 400, 500. FIGS. 6A-C provide graphs showing the power usage (e.g., the actual power usage, an expected power usage, etc.) of each of the industrial machines 300, 400, 500. As shown in FIG. 6A, the first industrial machine 300 operates below a first power threshold 380A (e.g., a peak power threshold) from time t0 to time t1. However, at time t1, the power usage of the first industrial machine 300 increases and exceeds the first power threshold 380A. The first power threshold 380A may be indicative of the peak power of the first industrial machine 300, a power usage of the first industrial machine 300 that approaches the peak power of the first industrial machine 300, or a combination thereof. The first power threshold 380A may change based on characteristics of the industrial machine 300, 400, 500 such as machine class, operating conditions, specific mine requirements, and the like. Therefore, the first power threshold 380A associated with the first industrial machine 300 may be different than the first power threshold 380B associated with the second industrial machine 400, which may also be different than the first power threshold 380C associated with the third industrial machine 500. In some embodiments, the first power threshold 380A associated with the first industrial machine 300, as well as the first power thresholds 380B, 380C associated with the second and third industrial machines 400, 500, respectively are configurable by a user. In other words, a user may select the first power threshold. 380A, 380B, 380C associated with each industrial machine 300, 400, 500. When the first industrial machine 300 exceeds the first power threshold 380A, the controller 334 of the first industrial machine 300 generates a signal or message including or related to the power usage information of the first industrial machine 300. The communication module 350 then transmits the signal to the second and third industrial machines 400, 500 over the first network 600. The signal alerts the second and third industrial machines 400, 500 that the first industrial machine 300 is operating above the first power threshold 380A.

In response to the signal from the first industrial machine 300, the second and third industrial machines 400, 500 determine whether to change the operation of the second and third machines 400, 500 based on the power usage of the second and third industrial machines 400, 500. The second and third industrial machines 400, 500 compare the current power usage of the industrial machines 400, 500 to a second power threshold 382B, 382C, respectively to determine whether to alter the operation of the industrial machines 400, 500. The second and third industrial machines 400, 500 may alter their operation to keep the cumulative power usage below the predetermined peak power. In some embodiments, the second power threshold 382B, 382C may be dynamically established once the second and third industrial machines 400, 500 receive information that the first industrial machine 300 operates above the first power threshold 380A. For example, the second power threshold 382B, 382C may be automatically set to a fixed value (e.g., 10 W, 100 W, 1000 W, etc.) below the current power usage of the second industrial machine 400 or the third industrial machine 500, respectively. In other implementations the second power threshold 382B, 382C may be set to, for example, a fixed value (e.g., 10 W, 100 W, 1000 W, etc.) below the first power threshold 380B, 380C, respectively associated with the industrial machine 400, 500. In other embodiments, the second power threshold 382B, 382C may be set equal to the first power threshold 380B, 380C. Like the first power threshold 380A, 380B, 380C, the second power threshold 382A, 382B, 382C is also configurable by a user. The second power threshold 382A, 382B, 382C may change based on the type of industrial machine, the machine class, operating conditions, specific mine requirements, and the like.

For example, the third industrial machine 500 determines if the power usage of the third industrial machine 500 is equal to or greater than the second power threshold 382C. As shown in FIG. 6C, the third industrial machine 500 does not exceed the second power threshold 382C (i.e., the power usage of the industrial machine 500 is below [or equal to] the second power threshold 382C). Therefore, the operation of the third industrial machine 500 is not altered because the power usage of the third industrial machine 500 is relatively low. Consequently, changes in the power usage of the third industrial machine 500 are not likely to cause the cumulative power usage to exceed the predetermined peak power.

As shown in FIG. 6B, the second industrial machine 400 operates above the second power threshold 382B from t0 to t1. At t1, when the second industrial machine 400 receives the message indicating that the first industrial machine 300 operates at or above the first power threshold 380A, the second industrial machine 400 compares its power usage to a third power threshold 384B. The third power threshold 384B is higher than the second power threshold 382B and becomes a power usage limit for the second industrial machine 400. The third power threshold 384A, 384B, 384C may be different for each industrial machine 300, 400, 500. In some embodiments, the third power threshold 384B is set to the current power usage under the assumption that if all things remain equal, the cumulative power does not exceed the predetermined peak power. In other embodiments, the third power threshold 384B may be set to be equal to the second power threshold 382B to inhibit the cumulative power usage from exceeding the predetermined peak power. Thus, the power usage of the second industrial machine 400 is reduced as a precautionary measure to remain below the third power threshold 384B. In some embodiments, the user may change or set the third power threshold 384A, 384B, 384C to different threshold values. In other embodiments, the industrial machine 300, 400, 500 contains instructions for determining the third power threshold 384A, 384B, 384C. In some embodiments, the third power threshold 384B is a dynamic power threshold. In other words, the third power threshold 384B changes based on the current power usage of the industrial machine 300, 400, 500. For example, in some embodiments, the third power threshold 384B may be set to a fixed value (e.g., 10 W, 100 W, 1000 W, etc.) below the current power usage. Therefore, the third power threshold 384B, in some embodiments, dynamically changes based on the current power usage.

As shown in FIG. 6B, the second industrial machine 400 operates above the third power threshold 384B from time t0 to time t1. However, at time t1, the controller 334 associated with the second industrial machine 400 alters operation of the second industrial machine 400 such that the power usage of the second industrial machine 400 remains below the third power threshold 384B. For example, the controller 334 associated with the second industrial machine 400 may limit the actuators 340, 342, 344 based on characteristics or parameters such as, a current position, machine cycle state, payload measurement, etc. The controller 334 associated with the second industrial machine 400 allows the second industrial machine 400 to continue operation without a significant impact on production while also maintaining a reduced power demand. In one example, the controller 334 primarily reduces the allowable torque generated by the actuators 340, 342, 344 and limits overlapping power demands from more than one actuator 340, 342, 344 of the second industrial machine 400. In other embodiments, the controller 334 may reduce the power usage by reducing power used by accessories of the second industrial machine 400. For example, the controller 334 may reduce power sent to the indicators 336, lights, or other secondary accessories of the second industrial machine 400.

At time, t2, the power usage of the first industrial machine 300 drops below the first power threshold 380A. At time t2, the power control system 353 transmits a signal or message to the second industrial machine 400 and the third industrial machine 500 indicating that the power usage of the first industrial machine 300 has dropped below the first power threshold 380A. When the second industrial machine 400 and the third industrial machine 500 receive the signal, the power control system 353 of each machine no longer limits the power usage of the industrial machine 400, 500 to the third power threshold 384B, 384C. For example, as shown in FIG. 6B, at t2, when the second industrial machine 400 receives an indication that the power usage of the first industrial machine 300 dropped below the first power threshold 380A, the second industrial machine 400 returns to its normal operation and can resume operating above the third power threshold 384B. Since the third industrial machine 500 did not operate above the third power threshold 384C, at least between t1 and t2, the operation of the third industrial machine 500 remains unaffected.

Figure 7:
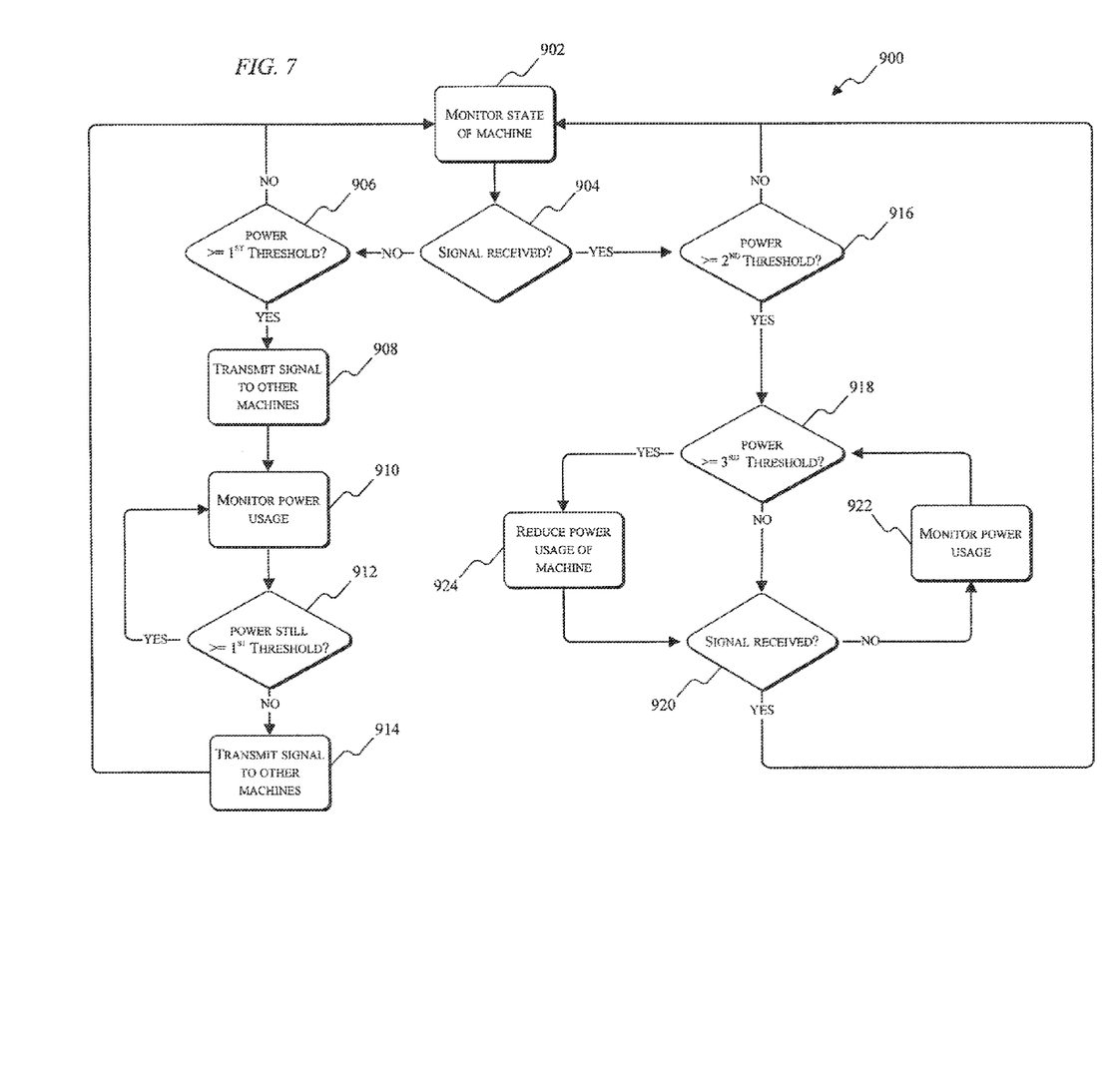
FIG. 7 illustrates a method of controlling power usage of an industrial machine.

FIG. 7 illustrates the process 900 associated with the power control system 353 included in each of the industrial machines 300, 400, 500. The process 900 is primarily implemented by the controller 334 and/or the power control module 378. The process 900 is associated with and described herein with respect to management of power consumption by the system 100 at a level of each industrial machine 300, 400, 500. Various steps described herein with respect to the process 900 are capable of being executed simultaneously, in parallel, or in an order that differs from the illustrated serial manner of execution. The process 900 may also be capable of being executed using fewer steps than are shown in the illustrated embodiment. Although the process 900 is described with regard to the first industrial machine 300, the process 900 is also implemented in the second industrial machine 400, the third industrial machine 500, and other industrial machines within the system 100 that receives power from the power distribution system 200.

The process 900 begins with the controller 334 monitoring the state of the first industrial machine 300 (step 902). For example, the controller 334 measures electrical characteristics (e.g., voltage, current draw, power consumed, instantaneous power, average power, real power, apparent power, expected power, etc.) of the first industrial machine 300. The controller 334 then determines whether the first industrial machine 300 has received a signal or message from another industrial machine (e.g., the second or third industrial machine 400, 500) indicating that the other industrial machine has entered a specific state or exceeded a first power threshold 380B, 380C (step 904). If the first industrial machine 300 has not received such a message from another industrial machine, the controller 334 determines whether the power usage of the first industrial machine 300 exceeds the first power threshold 380A (step 906). If the power usage of the first industrial machine 300 does not exceed the first power threshold 380A, the controller 334 continues to monitor the power usage of the first industrial machine 300 (step 902). If, on the other hand, the power usage of the first industrial machine 300 exceeds the first power threshold 380 (see FIG. 6A), the first industrial machine 300 transmits a signal or message to the other industrial machines through the first network 600 (step 908). The message indicates to the other industrial machines that the power usage of the first industrial machine 300 exceeds the first power threshold 380. In some embodiments, the first industrial machine 300 compares its power usage to the first power threshold 380A before checking for a received signal from another industrial machine 400, 500.

Once the first industrial machine 300 has transmitted the message to the second industrial machine 400 and the third industrial machine 500, the controller 334 continues to monitor the power usage of the first industrial machine 300 (step 910), and compares the power usage to the first power threshold 380 (step 912) to determine if the power usage of the first industrial machine 300 remains above the first power threshold 380. When the power usage of the first industrial machine 300 falls below the first power threshold 380, the first industrial machine 300 transmits a signal or message to the second industrial machine 400 and the third industrial machine 500 (step 914). The signal or message indicates that the power usage of the first industrial machine 300 has fallen below the first power threshold 380.

If at step 904, if the first industrial machine 300 receives a message from another industrial machine indicating that the power usage of the other industrial machine exceeds the first power threshold 380, the controller 334 determines if the power usage of the first industrial machine 300 is greater than or equal to the second power threshold 382 (step 916). If the power usage of the first industrial machine 300 is not greater than or equal to the second power threshold 382 (see FIG. 6C), the first industrial machine 300 continues operating and monitoring the power usage of the first industrial machine 300 (step 902). If, at step 916, the power usage of the first industrial machine 300 exceeds the second power threshold 382 (see FIG. 6B), the controller 334 proceeds to determine whether the power usage of the first industrial machine 300 is also greater than or equal to the third power threshold 384 (step 918). If the controller 334 determines that the power usage of the first industrial machine 300 is not greater than or equal to the third power threshold 384, the controller 334 continues to monitor the power usage of the first industrial machine 300 with respect to the third power threshold 384. The controller 334 also checks if the signal indicating that the power usage of the other industrial machine has dropped below the first power threshold 380 has been received (step 920). If the first industrial machine 300 does not receive indication that the power usage of the other industrial machine is below the first power threshold 380, the controller 334 measures the power usage of the first industrial machine 300 (step 922), and compares it to the third power threshold 384 (step 918). If, at step 918, the controller 334 determines that the power usage of the first industrial machine 300 exceeds the third power threshold 384, the controller 334 reduces the power usage of the first industrial machine 300 (see FIG. 6B) such that the power usage of the first industrial machine 300 remains below the third power threshold 384 (step 924). Thus, the power control system 353 continues to monitor the power usage of the first industrial machine 300 with respect to specific thresholds and the power usage of other industrial machines within the system 100.

Thus, the invention provides, among other things, a power monitoring system implemented in each of a plurality of industrial machines to prevent the cumulative power of the system from exceeding the predetermined peak power. Various features and advantages of the invention are set forth in the following claims.

What is claimed is:

1. A system including a first industrial machine and a second industrial machine, the system comprising:
   a power distribution system configured to provide power to the first industrial machine and the second industrial machine;
   the first industrial machine including a first power control system configured to monitor power usage of the first industrial machine,
      compare the power usage of the first industrial machine to a first power threshold,
      transmit power usage information of the first industrial machine to the second industrial machine when the power usage of the first industrial machine is greater than or equal to the first power threshold,
      receive power usage information from the second industrial machine,
      control power usage of the first industrial machine based on the power usage information received from the second industrial machine; and
   the second industrial machine including a second power control system configured to
      monitor power usage of the second industrial machine,
      transmit the power usage information of the second industrial machine to the first industrial machine,
      receive the power usage information from the first industrial machine,
      compare the power usage of the second industrial machine to a second power threshold,
      control power usage of the second industrial machine based on the power usage information received from the first industrial machine,
      wherein the second power control system is configured to reduce the power usage of the second industrial machine when the power usage of the first industrial machine is greater than or equal to the first power threshold and the power usage of the second industrial machine is greater than or equal to the second power threshold.

2. The system of claim 1, wherein the second power control system is further configured to determine a value for a dynamic power threshold based on the power usage information from the first industrial machine and a peak power provided by the power distribution system, and control the power usage of the second industrial machine such that the power usage of the second industrial machine is less than or equal to the dynamic power threshold.

3. A method of controlling an industrial machine having a power control system, the method comprising:
   receiving power from a power distribution system;
   monitoring, by the power control system, power usage of the industrial machine;
   comparing the power usage of the industrial machine to a first power threshold;
   transmitting power usage information of the industrial machine to a second industrial machine receiving power from the power distribution system when the power usage of the industrial machine is greater than or equal to the first power threshold;

receiving power usage information from the second industrial machine;

comparing the power usage of the industrial machine to a second power threshold when the power control system receives the power usage information from the second industrial machine; and controlling power usage of the industrial machine based on the power usage information received from the second industrial machine, wherein the power usage of the industrial machine is reduced when the power usage of the industrial machine is greater than or equal to the second power threshold and the power usage information from the second industrial machine indicates that the power usage of the second industrial machine is greater than or equal to a third power threshold.

4. The method of claim 3, further comprising determining a value for the second power threshold based on the power usage information of the second industrial machine and a peak power provided by the power distribution system.

5. The method of claim 4, wherein controlling operation of the industrial machine includes controlling power usage of the industrial machine such that the power usage of the industrial machine remains less than or equal to the value for the second power threshold.

6. The method of claim 4, further comprising setting the value for the second power threshold to a current power usage of the industrial machine.

7. The method of claim 6, further comprising controlling power usage of the industrial machine such that the power usage of the industrial machine remains less than or equal to the value for the second power threshold.

8. An industrial machine comprising:
a component;
an actuator coupled to the component and configured to provide a force to the component; and
a power control system electrically coupled to the actuator and to a power distribution system, the industrial machine configured to receive power from the power distribution system, the power control system configured to
monitor a state of the industrial machine, the state of the industrial machine including a power usage of the industrial machine,
compare the power usage of the industrial machine to a first power threshold,
transmit power usage information of the industrial machine to at least a second industrial machine that is configured to receive power from the power distribution system when the power usage of the industrial machine is greater than or equal to the first power threshold,
receive state information from a second industrial machine, the state information from the second industrial machine including a second power usage of the second industrial machine,
compare the power usage of the industrial machine to a second power threshold when the power control system receives the state information from the second industrial machine, and
control power usage of the industrial machine based on the state information received from the second industrial machine,
wherein the power control system is configured to reduce the power usage of the industrial machine when the power usage of the industrial machine is greater than or equal to the second power threshold and the second power usage of the second industrial machine is greater than or equal to a third power threshold.

9. The industrial machine of claim 8, wherein the first power threshold is configurable by a user.

10. The industrial machine of claim 8, wherein the component is selected from the group consisting of a dipper, a boom, a dump box, a drill, a blade, an elevator, a mixer, a lift, and a cutter.

11. The industrial machine of claim 8, wherein the power control system is further configured to determine a value for a fourth power threshold, and wherein the power control system controls the power usage of the industrial machine to be below the fourth power threshold when the power usage of the industrial machine is greater than or equal to the second power threshold.

12. The industrial machine of claim 8, wherein the power control system is further configured to determine a value for the second power threshold based on the power usage information from the second industrial machine and a peak power provided by the power distribution system.

13. The industrial machine of claim 12, wherein the power control system is further configured to control the power usage of the industrial machine such that the power usage of the industrial machine remains below the value for the second power threshold.

14. The industrial machine of claim 12, wherein the power control system is further configured to set the value for the second power threshold to a current power usage of the industrial machine.

15. The industrial machine of claim 14, wherein the power control system is further configured to limit the power provided to the industrial machine such that the power usage of the industrial machine remains below the value for the second power threshold.

16. The industrial machine of claim 8, wherein the industrial machine further includes a second component and a second actuator, and wherein the power control system is configured to control power provided to the first actuator and the second actuator based on the power usage of the industrial machine and the power usage information received from the second industrial machine.

17. The industrial machine of claim 8, wherein the state of the industrial machine includes an expected power usage of the industrial machine.

18. The industrial machine of claim 17, wherein the state of the second industrial machine includes a second expected power usage of the second industrial machine, and wherein the power control system is further configured to compare the expected power usage of the industrial machine to the first power threshold, and transmit power usage information of the industrial machine to at least the second industrial machine when the expected power usage of the industrial machine is greater than or equal to the first power threshold.

* * * * *